United States Patent
Chan et al.

(10) Patent No.: US 11,516,430 B2
(45) Date of Patent: Nov. 29, 2022

(54) VIDEO PROCESSING METHOD AND VIDEO PROCESSOR

(71) Applicant: REALTEK SEMICONDUCTOR CORP., Hsinchu (TW)

(72) Inventors: Chun-Chieh Chan, Hsinchu (TW); Yu-Le Shen, Hsinchu (TW); Tai-Jung Wu, Hsinchu (TW); Chia-Hao Chang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 17/474,132

(22) Filed: Sep. 14, 2021

(65) Prior Publication Data

US 2022/0166952 A1 May 26, 2022

(30) Foreign Application Priority Data

Nov. 25, 2020 (TW) ................................ 109141335

(51) Int. Cl.
*H04N 7/087* (2006.01)
*H04N 7/01* (2006.01)
*H04N 5/38* (2006.01)

(52) U.S. Cl.
CPC ............... *H04N 7/087* (2013.01); *H04N 5/38* (2013.01); *H04N 7/01* (2013.01)

(58) Field of Classification Search
CPC ............ H04N 5/04; H04N 5/38; H04N 7/087; H04N 7/088; H04N 7/01; H04N 5/268

USPC ....... 348/441, 705, 706, 723, 682, 500, 529, 348/545, 547, 633, 634
See application file for complete search history.

(56) References Cited

U.S. PATENT DOCUMENTS

| 7,193,598 B2 | 3/2007 | Huang |
| 7,983,525 B2 * | 7/2011 | Nakamura ............... H04N 5/77 348/553 |
| 2010/0026848 A1 | 2/2010 | Kakehi |

FOREIGN PATENT DOCUMENTS

| CN | 101563914 A | 10/2009 |
| TW | 200428352 A | 12/2004 |

* cited by examiner

*Primary Examiner* — Sherrie Hsia
(74) *Attorney, Agent, or Firm* — Li & Cai Intellectual Property (USA) Office (57) ABSTRACT

A video processing method and a video processor are provided. The video processing method can be utilized in a video processing system that includes a transmission terminal for generating an input video, the video processor, and a receiving terminal for receiving an output video. The method includes determining whether or not the input video is in at least one of an idle status, an unstable status and a terminated status; switching from outputting the output video to outputting a mute video when the input video is determined to be in at least one of the idle status, the unstable status and the terminated status; inserting a first general control packet for setting mute into one of a plurality of output frames of the mute video; and stopping outputting the mute video after the plurality of output frames of the mute video are outputted.

20 Claims, 7 Drawing Sheets

FIG. 1

| | Active pixel | Blanking start | Vertical blanking identification | Image timestamp(0) | Sound timestamp(0) | Virtual pixel(0) | ... | Virtual pixel(0) | Blanking start | Vertical blanking identification | ... |
|---|---|---|---|---|---|---|---|---|---|---|---|
| Lane0 ... | Active pixel | Blanking start | Vertical blanking identification | Image timestamp(0) | Sound timestamp(0) | Virtual pixel(0) | ... | Virtual pixel(0) | Blanking start | Vertical blanking identification | ... |
| Lane1 ... | Active pixel | Blanking start | Vertical blanking identification | Image timestamp(0) | Sound timestamp(0) | Virtual pixel(0) | ... | Virtual pixel(0) | Blanking start | Vertical blanking identification | ... |
| Lane2 ... | Active pixel | Blanking start | Vertical blanking identification | Image timestamp(0) | Sound timestamp(0) | Virtual pixel(0) | ... | Virtual pixel(0) | Blanking start | Vertical blanking identification | ... |
| Lane3 ... | Active pixel | Blanking start | Vertical blanking identification | Image timestamp(0) | Sound timestamp(0) | Virtual pixel(0) | ... | Virtual pixel(0) | Blanking start | Vertical blanking identification | ... |

Switching to the idle pattern 8192 characters 8188 characters

VIDEO PROCESSING METHOD AND VIDEO PROCESSOR

CROSS-REFERENCE TO RELATED PATENT APPLICATION

This application claims the benefit of priority to Taiwan Patent Application No. 109141335, filed on Nov. 25, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a video processing method and a video processor, and more particularly to a video processing method and a video processor that can generate a mute video when an input video is in an unstable status.

BACKGROUND OF THE DISCLOSURE

Currently, a display port (DP) video interface and a high definition multimedia interface (HDMI) are the most widely used digital video interfaces, and a type C connector can be used to transmit a video signal that complies with a DP protocol. In practice, however, video transmission protocols supported on a transmission terminal (i.e., source end) and a receiving terminal (i.e., sink end) may be different. For example, the transmission terminal generates and transmits a video signal according to the DP protocol, while the receiving terminal parses the video signal and displays the video signal according to the HDMI protocol. For compatibility between the transmission terminal and the receiving terminal, the video signal transmitted by the transmission terminal is converted into a resolvable video signal for the receiving terminal through a video processor (i.e., protocol converter, PCON). For example, the video signal according to the DP protocol is converted into the video signal according to the HDMI protocol through the video processor.

Since a source of the video signal input to the video processor is the transmission terminal, when the transmission terminal interrupts the signal output or stops transmitting a video data without warning (e.g., by switching a video resolution, switching a special video function, turning off a device power, etc.), the video processor stops inputting the video signal due to a lack of a valid signal input. Therefore, when the transmission terminal (e.g., computer, cell phone, etc.) directly terminates the valid signal input, a noise screen may appear on the receiving terminal (e.g., TV, etc.) that causes a poor user experience.

Accordingly, how the poor user experience caused by the noise screen on the receiving terminal can be prevented by improving the video processor to overcome the above-mentioned shortcomings has become one of the important issues to be solved in the related field.

SUMMARY OF THE DISCLOSURE

In response to the above-referenced technical inadequacies, the present disclosure provides a video processing method. The video processing method can be utilized in a video processing system. The video processing system includes a transmission terminal for generating an input video, a video processor and a receiving terminal for receiving an output video. The video processing method includes: determining whether or not the input video is in at least one of an idle status, an unstable status and a terminated status; switching from outputting the output video to outputting a mute video when the input video is determined to be in the at least one of the idle status, the unstable status and the terminated status; inserting a first general control packet for setting mute into at least one of a plurality of output frames of the mute video; and stopping outputting the mute video after the plurality of output frames of the mute video are outputted.

In another aspect, the present disclosure provides a video processor. The video processor can be utilized in a video processing system. The video processing system includes a transmission terminal for generating an input video and a receiving terminal for receiving an output video. The video processor includes a signal instability detecting module, a video masking processing controller, an input signal tracking module, a mute screen generator, a general control packet inserting module and an output signal transmitter. The signal instability detecting module is used to generate a first detecting signal when the signal instability detecting module detects that the input video is in at least one of an idle status, an unstable status and a terminated status. The video masking processing controller is coupled to the signal instability detecting module, and is used to generate a first control signal according to the first detecting signal. The input signal tracking module is coupled to the video masking processing controller, and is used to stop tracking the input signal according to the first control signal. The mute screen generator is coupled to the video masking processing controller, and is used to output a mute video including a plurality of output frames according to the first control signal. Each of the plurality of output frames is a mute screen. The general control packet inserting module is coupled to the video masking processing controller, and is used to generate a first general control packet for setting mute according to the first control signal. The output signal transmitter is coupled to the video masking processing controller, and is used to insert the first general control packet into a pixel window of the plurality of output frames of the mute video, and output the plurality of output frames of the mute video.

Therefore, one of the effects of the present disclosure is that by virtue of "the mute video being autonomously outputted to the receiving terminal when the input video is determined to be in the at least one of the idle status, the unstable status and the terminated status", the noise screen at the receiving terminal can be prevented, and the user experience can be improved by the video processing method and the video processor provided by the present disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

EMBODIMENT

Figure 1:
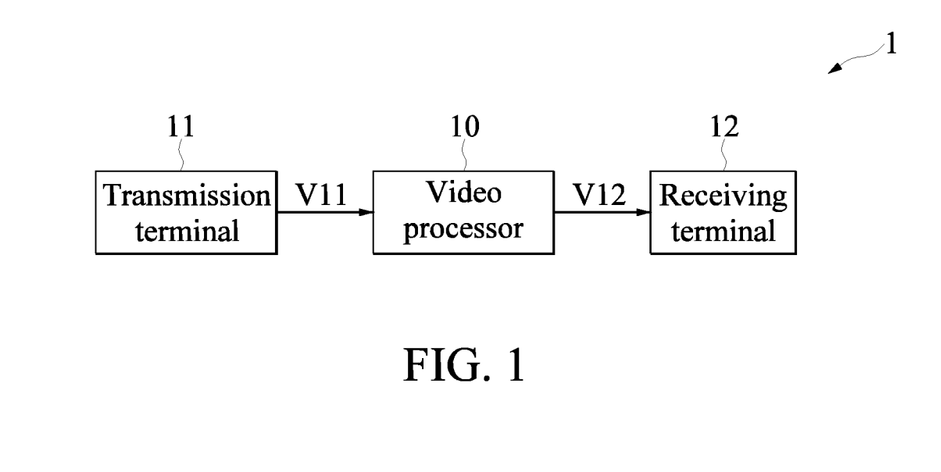
FIG. 1 is a functional block diagram of a video transmission system.

FIG. 1 is a functional block diagram of a video transmission system 1. The video transmission system 1 includes a transmission terminal 11, a video processor 10 and a receiving terminal 12. The video processor 10 is, for example, a single-input single-output or a single-input multiple-output protocol converter, a dongle, a docking device, a high definition multimedia interface (HDMI) retimer, etc. The transmission terminal 11 is, for example, a computer, a mobile phone, a type C connector, etc. The receiving terminal 12 is a display device, such as TV, etc. The video processor 10 is coupled between the transmission terminal 11 and the receiving terminal 12, and is used to convert an input video V11 conforming to a first video transmission protocol (e.g., a display port (DP) protocol) into an output video V12 conforming to a second video transmission protocol (e.g., an HDMI protocol) and output the output video V12 to the receiving terminal 12.

Figure 2:
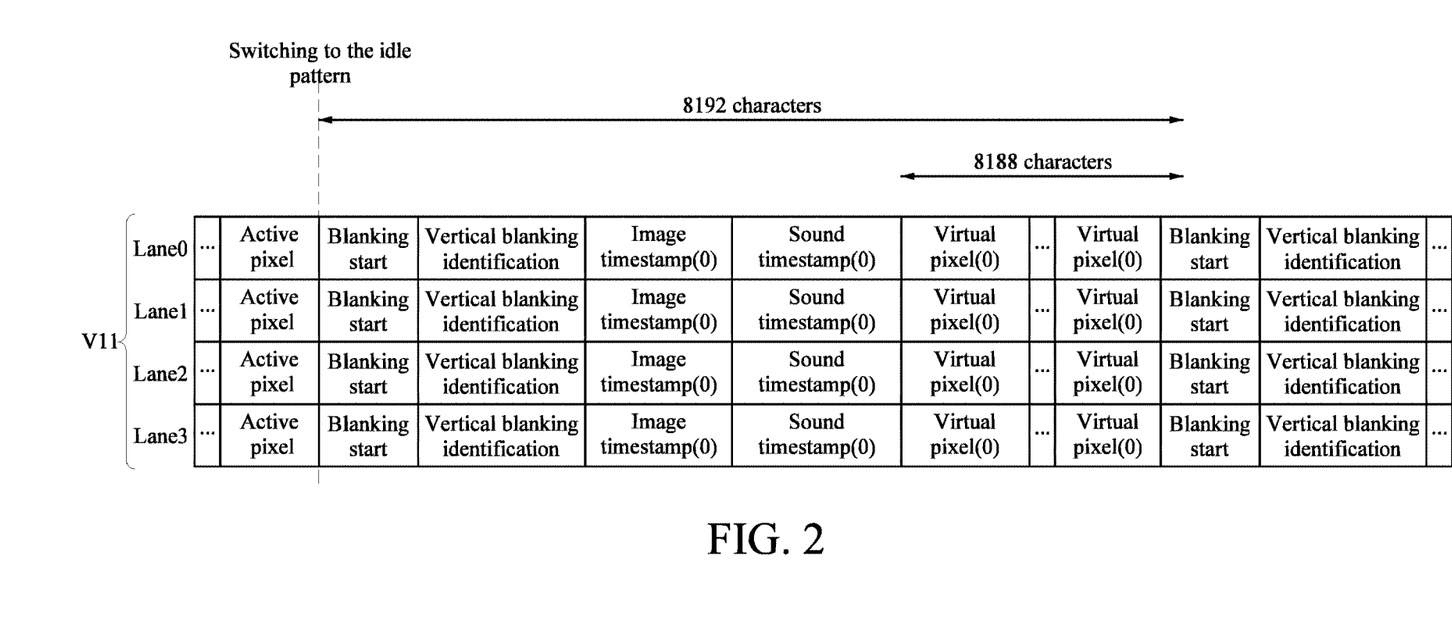
FIG. 2 is a schematic view of an input signal generated by a transmission terminal of FIG. 1 according to a display port (DP) protocol.

FIG. 2 is a schematic view of the input video V11 generated by the transmission terminal 11 of FIG. 1 according to the DP protocol. The DP protocol has a specification to synchronize a data transmission through multiple lanes to increase data transmission amount, for example, through Lane 0, Lane 1, Lane 2 and Lane 3 to synchronize the transmission of the input video V11. In addition, the DP protocol has an early warning mechanism when the transmission terminal 11 stops outputting an image information. For example, when no image data is available, the transmission terminal 11 switches to an idle mode and outputs an idle pattern to notify the receiving terminal (i.e., the video processor 10) that no image information is currently available.

Specifically speaking, when the image information is available, the transmission terminal 11 outputs an active pixel. On the contrary, when no image information is available, the transmission terminal 11 outputs the idle pattern, the content of which is shown in FIG. 2. When the transmission terminal 11 switches to the idle mode, the transmission terminal 11 firstly transmits a blanking start (hereafter referred to as BS) character, and then transmits a vertical blanking identification (hereafter referred to as VB-ID) character to indicate a transmission status of an audio/video data. When a value of a NoVideoStream_Flag bit [3] is set to 1, the video processor 10 knows that the transmission terminal 11 has started transmitting the idle pattern. The transmission terminal 11 then transmits an image timestamp character (Mvid (0)) and a sound timestamp character (Maud(0)) to assist a recovery of an image clock and a sound clock, and values of the image timestamp character and the sound timestamp character are set to zero because there is no image and sound information available while the idle pattern is transmitted. Assuming that a clock cycle of any horizontal display line includes 8192 characters, after transmitting the abovementioned four characters, the transmission terminal 11 transmits a remaining 8188 characters as dummy characters and sets values of the remaining 8188 characters to zero. In this way, the transmission terminal 11 continues to transmit the idle pattern in horizontal display lines until there is image information available for transmitting to the receiving terminal (i.e., the video processor 10). The following Table 1 is a bit definition of the VB-ID characters.

TABLE 1

| Bit definition of the VB-ID characters | |
|---|---|
| Bit [7] | Reserved |
| Bit [6] | CompressedStream_Flag |
| Bit [5] | HDCP SYNC DETECT |
| Bit [4] | AudioMute_Flag |
| Bit [3] | NoVideoSteam_Flag |
| Bit [2] | Interlace_Flag |
| Bit [1] | FieldID_Flag |
| Bit [0] | VerticalBlanking_Flag |

Figure 3:
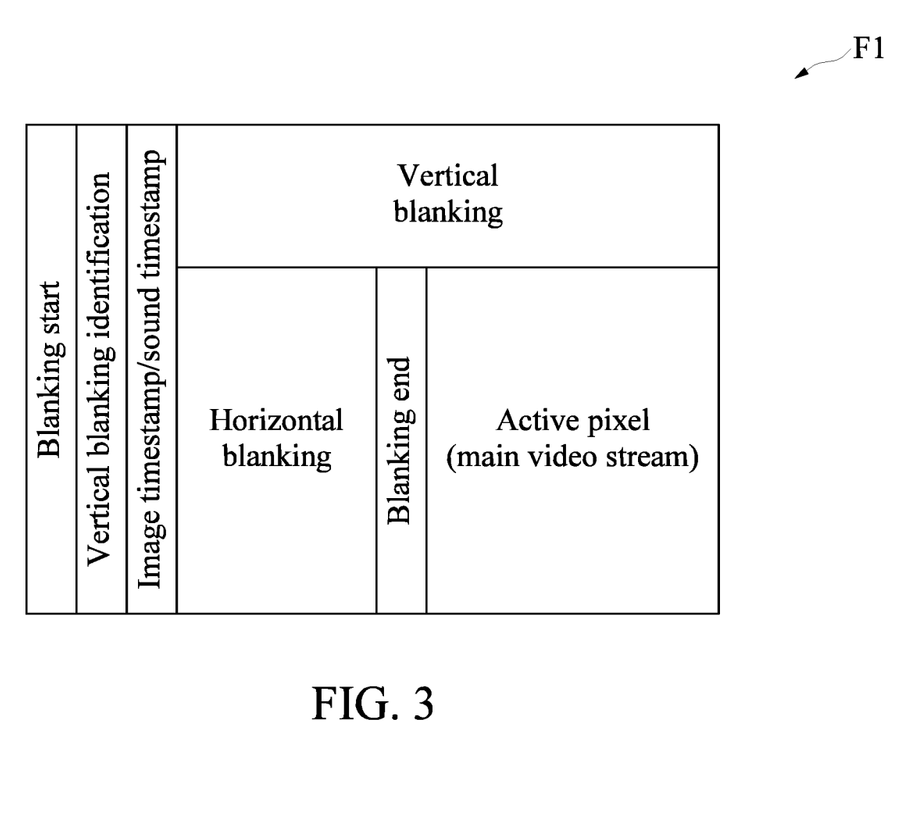
FIG. 3 is a schematic view of an image frame generated by the transmission terminal of FIG. 1 according to the DP protocol.

FIG. 3 is a schematic view of an image frame F1 generated by the transmission terminal 11 of FIG. 1 according to the DP protocol. Since the DP protocol specifies that a start of any horizontal display line of the image frame F1 is marked as the BS character, the transmission terminal 11 can switch to an idle pattern at the start of any horizontal display line of the image frame F1. In other words, the DP protocol notifies the receiving terminal (i.e., the video processor 10) that no image information is currently available by using the horizontal display line as a unit.

Figure 4:
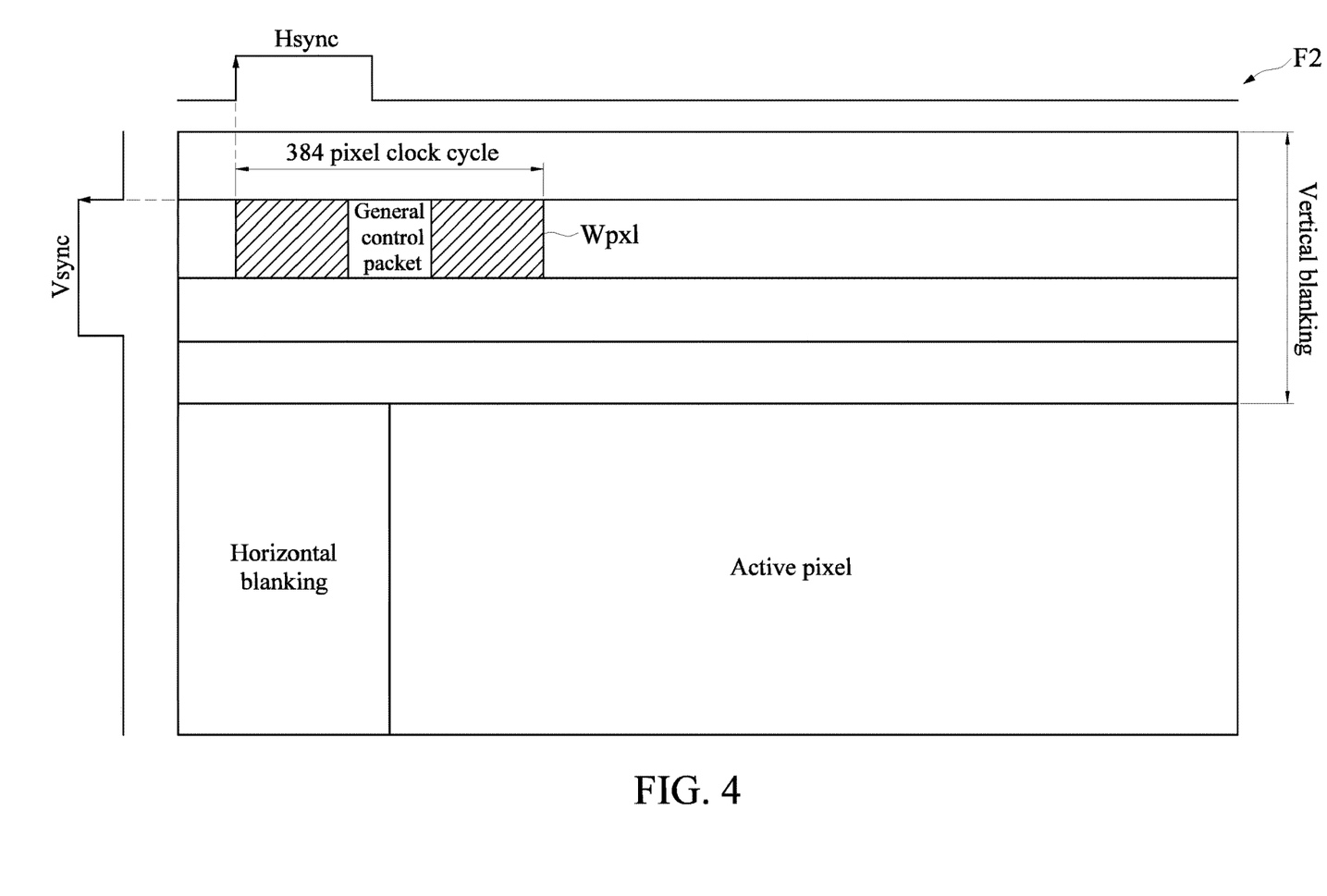
FIG. 4 is a schematic view of an image frame generated by a receiving terminal of FIG. 1 according to a high definition multimedia interface (HDMI) protocol.

FIG. 4 is a schematic view of an image frame F2 generated by the receiving terminal 12 of FIG. 1 according to the HDMI protocol. The HDMI protocol specifies that the image frame F2 each must include a general control packet (GCP). The general control packet includes a general screen information, such as a Set_AVMUTE bit [0], color depth (CD) bits [1] to [3] and a Clear_AVMUTE bit [4]. The HDMI protocol notifies the receiving terminal (i.e., the video processor 10) by using the Set_AVMUTE bit [0] and the Clear_AVMUTE bit [4] that a subsequent image frame needs to be muted or unmuted. In addition, the HDMI protocol defines that with the Set_AVMUTE bit [0] or the Clear_AVMUTE bit [4], the general control packet must be transmitted in a pixel window Wpxl (e.g., the pixel window with a length of a 384 pixel clock cycle) after a rising edge of a vertical synchronization signal Vsync and a horizontal synchronization signal Hsync of the image frame F2. In other words, the HDMI protocol notifies the receiving terminal (i.e. the video processor 10) that the subsequent frame needs to be muted or unmuted only at a specific location of the image frame F2, so that the HDMI protocol notifies the receiving terminal (i.e., the video processor 10) in units of one frame. Accordingly, when the transmission terminal 11 transmits the idle pattern after the pixel window Wpxl, an existing video processor is not able to mute a screen in time for the current image frame F2, so that the image frame F2 received by the receiving terminal 12 may have a noise, which results in a poor user experience.

In order to solve a deficiency of the existing video processor, the video processor of the present disclosure can autonomously output a mute video Vblk to the receiving terminal 12 when the video processor detects that the input video V11 is in at least one of an idle status, an unstable status, and a terminated status, so that a noise screen at the receiving terminal 12 can be prevented and then the user experience can be improved.

Figure 5:
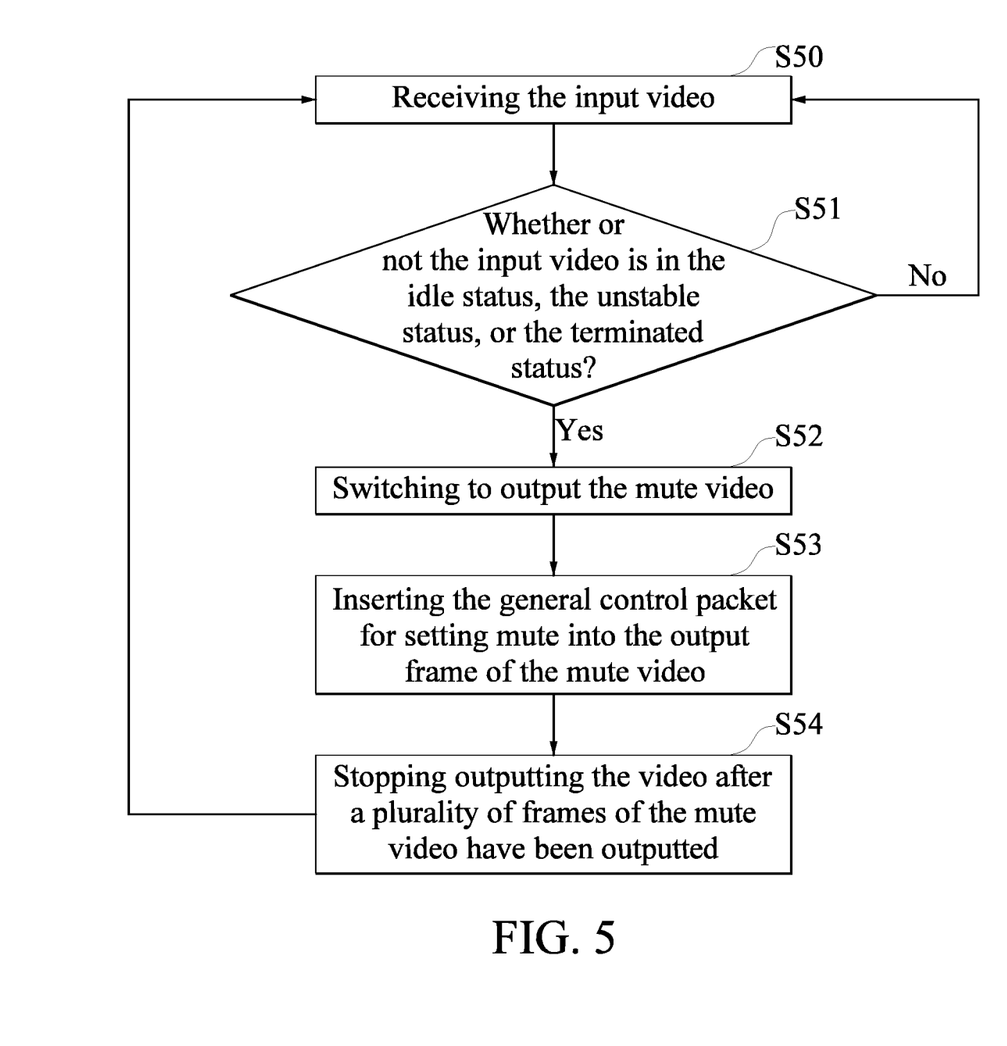
FIG. 5 is a flowchart of a video processing method according to one embodiment of the present disclosure.
Figure 6:
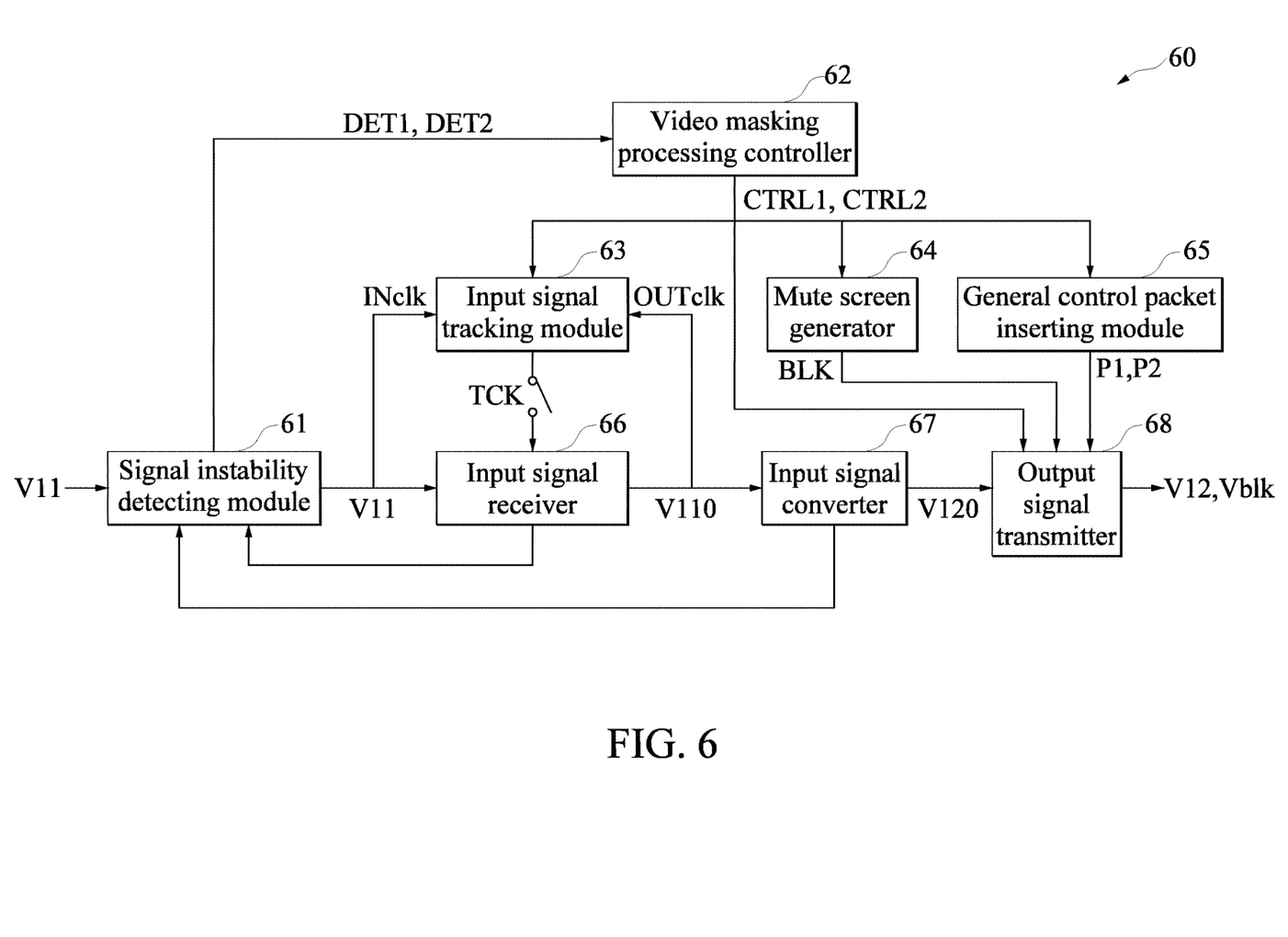
FIG. 6 is a functional block diagram of a video processor according to the one embodiment of the present disclosure.

FIG. 5 is a flowchart of a video processing method according to the first embodiment of the present disclosure. FIG. 6 is a functional block diagram of a video processor 60 according to the first embodiment of the present disclosure. The video processor 60 can be used in place of the video processor 10 of FIG. 1 to perform the video processing method of FIG. 5, and the video processing method includes the following steps:

Step S50: receiving the input video.

Step S51: determining whether or not the input video is in the idle status, the unstable status or the terminated status. If yes, proceed to step S52; if not, return to step S50.

Step S52: switching to output the mute video.

Step S53: inserting the general control packet for setting mute into an output frame of the mute video.

Step S54: stopping outputting the mute video after a plurality of frames of the mute video are outputted. Return to step S50.

In the flow of FIG. 5, the video processing method of the present disclosure determines whether or not the input video V11 is in the idle status, the unstable status or the terminated status (step S51) when the video processor 60 receives the input video V11 (step S50), and the video processor 60 does not immediately stop outputting the video V12, but instead outputs the mute video Vblk (step S52). An advantage of steps S51 to S52 is that the video processor 60 can immediately output the mute video Vblk even if the input video V11 has been the idle pattern and a NoVideoSteam_Flag of the current image frame appears at a time point beyond when the general control packet can transmit the image window Wpxl, thereby preventing the noise screen at the receiving terminal 12. Then, the video processor 60 inserts the general control packet for setting mute into the output frame of the mute video (step S53), so that the receiving terminal 12 can decide autonomously whether or not to mute a screen according to a set mute information of the general control packet. Further, the video processor 60 stops outputting the video after the plurality of frames of the mute video are outputted (step S54), and returns to step S50 to receive the input video V11 and determines whether or not the input video V11 is in a normal status (step S51). In one embodiment, the mute video Vblk outputted by the video processor 60 includes at least three frames. In this way, through the video processing method of the present disclosure, a compatibility between the transmission terminal 11 and the receiving terminal 12 can be improved, and the noise screen at the receiving terminal 12 can be prevented when the input video V11 is detected to be in the idle status, the unstable status or the terminated status, so that the user experience can be improved.

As shown in FIG. 6, the video processor 60 includes a signal instability detecting module 61, a video masking processing controller 62, an input signal tracking module 63, a mute screen generator 64, a general control packet inserting module 65, an input signal receiver 66, an input signal converter 67 and an output signal transmitter 68.

The signal instability detecting module 61 is correspondingly coupled to the video masking processing controller 62 and the input signal tracking module 63 to detect a value of the VB-ID character bit [3] of the input video V11 decoded by the input signal receiver 66, so as to determine whether or not the input video V11 is in the idle status (step S51). When the value of the VB-ID character bit [3] is not 1, the signal instability detecting module 61 determines that the input video V11 includes the image information. On the other hand, when the value of the VB-ID character bit [3] is 1, the signal instability detecting module 61 determines that the input video V11 includes the idle pattern without the image information and generates a first detecting signal DET1 to the video masking processing controller 62. In one embodiment, the signal instability detecting module 61 is correspondingly coupled to the input signal receiver 66 and the input signal converter 67 to detect whether or not an unlock of a clock data recovery (CDR) has occurred at the input signal receiver 66 of a physical layer, whether or not an overflow or an underflow has occurred at a first-in first-out (FIFO) circuit for receiving the input video V11 inside the input signal receiver 66, and whether or not an error has occurred in the input signal converter 67 when checking that the input signal receiver 66 decodes 8-bits bits to 10-bits (8 b/10 b) according to the DP protocol. When any of the abovementioned conditions occurs, the signal instability detecting module 61 determines that the input video V11 is in the unstable status or the terminated status (step S51) and accordingly generates the first detecting signal DET1 to the video masking processing controller 62. In one embodiment, when the video processor 60 is the HDMI retimer, each of the transmission terminal 11 and the receiving terminal 12 supports the HDMI protocol. When the transmission terminal 11 stops outputting the valid video or the active pixel without transmitting the set mute information of the general control packet, the signal instability detecting module 61 can instantly determine that an anomaly has occurred at the FIFO circuit inside the input signal receiver 66 (i.e., the input video V11 is in the unstable status or the terminated status), output the mute video Vblk, insert the general control packet, and set the value of the Set_AVMUTE bit to 1.

The video masking processing controller 62 is correspondingly coupled to the signal instability detecting module 61, the input signal tracking module 63, the mute screen generator 64, the general control packet inserting module 65 and the output signal transmitter 68 for generating a first control signal CTRL1 according to the first detecting signal DET1 correspondingly to the input signal tracking module 63, the mute screen generator 64, the general control packet inserting module 65 and the output signal transmitter 68. The first control signal CTRL1 and a second control signal CTRL2 are used to control the input signal tracking module 63 to stop tracking the input signal, to control the mute screen generator 64 to output a plurality of black screens BLK to the output signal transmitter 68, to control the general control packet inserting module 65 to generate a first general control packet P1 of which the value of the Set_AVMUTE bit [4] is 1, to control the output signal transmitter 68 to stop receiving a relay output video V120 generated by the input signal converter 67 and outputting the mute video Vblk in a transition minimized differential signaling (TMDS) mode after the plurality of frames of the mute video Vblk are outputted, or to control the output signal transmitter 68 to autonomously transmit a gap packet in a fixed rate link (FRL) mode.

The input signal tracking module 63 is correspondingly coupled to the signal instability detecting module 61, the video masking processing controller 62, the input signal receiver 66 and the input signal converter 67 for tracking a rate of an input clock INclk of the input video V11 at a front end of the input signal tracking module 63 and determining whether or not a rate of an output clock OUTclk of a relay input video V110 at a rear end of the input signal tracking module 63 requires to be adjusted. For example, the input signal tracking module 63 can output a tracking signal TCK to the input signal receiver 66 to adjust the rate of the output clock OUTclk of the relay input video V110, so as to prevent an interruption or the anomaly to the output due to the overflow or the underflow at the FIFO circuit inside the input signal receiver 66. In one embodiment, the input signal tracking module 63 determines whether or not a difference between the rate of the input clock INclk and the rate of the output clock OUTclk reaches a threshold value, so as to determine whether or not to cancel tracking the input video V11. When the input signal tracking module 63 determines that the difference between the rate of the input clock INclk and the rate of the output clock OUTclk reaches the threshold value, the input signal tracking module 63 can immediately cancel tracking the input video V11, such as cutting off the tracking signal TCK, thereby interrupting a feedback control of the relay input video V110 to maintain the rate of the input clock INclk of the current input video V11. Accordingly, the output can be stabilized and the downstream input signal converter 67 can be prevented from following the signal instability of the upstream input signal receiver 66 and causing an unlock of the clock of the receiving terminal 12.

The mute screen generator 64 is correspondingly coupled to the video masking processing controller 62 and the output signal transmitter 68 for generating the image frame F2 that is all black (as shown in FIG. 4) according to a color coding corresponding to a color space of an image outputted by the video processor 60 when receiving the first control signal CTRL1. For example, when the image outputted by the video processor 60 (as shown in FIG. 1) uses the color coding of a red-green-blue color space, the color coding of the image frame F2 that is all black is (0, 0, 0). In addition, when the image outputted by the video processor 60 uses the color coding of a YCbCr color space, the color coding of the image frame F2 that is all black is (0, 128, 128).

The general control packet inserting module 65 is correspondingly coupled to the video masking processing controller 62 and the output signal transmitter 68 for, according to the HDMI protocol, generating the first general control packet P1 of which the value of the Set_AVMUTE bit [4] is 1 to the output signal transmitter 68. According to the HDMI protocol, the output signal transmitter 68 then inserts the first general control packet P1 into the image frame F2 in the pixel window Wpxl, so as to generate the mute video Vblk to the receiving terminal 12.

In brief, through the signal instability detecting module 61, the video processor 60 of the present disclosure can generate the first detecting signal DET1 to the video masking processing controller 62 by detecting whether or not the input video V11 is in the idle status (i.e., the value of the VB-ID character bit [3] is 1), the unstable status or the terminated status. The video masking processing controller 62 accordingly generates the first control signal CTRL1 to the input signal tracking module 63, the mute screen generator 64, the general control packet inserting module 65, and the output signal transmitter 68, so that the output signal transmitter 68 inserts the first general control packet P1 into the image frame F2 in the image window Wpxl according to the HDMI protocol to generate the mute video Vblk to the receiving terminal 12. Accordingly, the noise screen at the receiving terminal 12 can be prevented, and then the user experience can be improved.

On the other hand, when the signal instability detecting module 61 detects that the value of the VB-ID character bit [3] is not 1, or the input video V11 is in the stable status, the signal instability detecting module 61 can output a second detecting signal DET2 to the video masking processing controller 62, and the video masking processing controller 62 accordingly generates the second control signal CTRL2 to the general control packet inserting module 65. Accordingly, the general control packet inserting module 65 generates a second general control packet P2 of which a value of the Clear_AVMUTE bit [5] is 1 to the output signal transmitter 68, so that the output signal transmitter 68 stops generating the mute video Vblk and generates the output video V12 to the receiving terminal 12.

Figure 7:
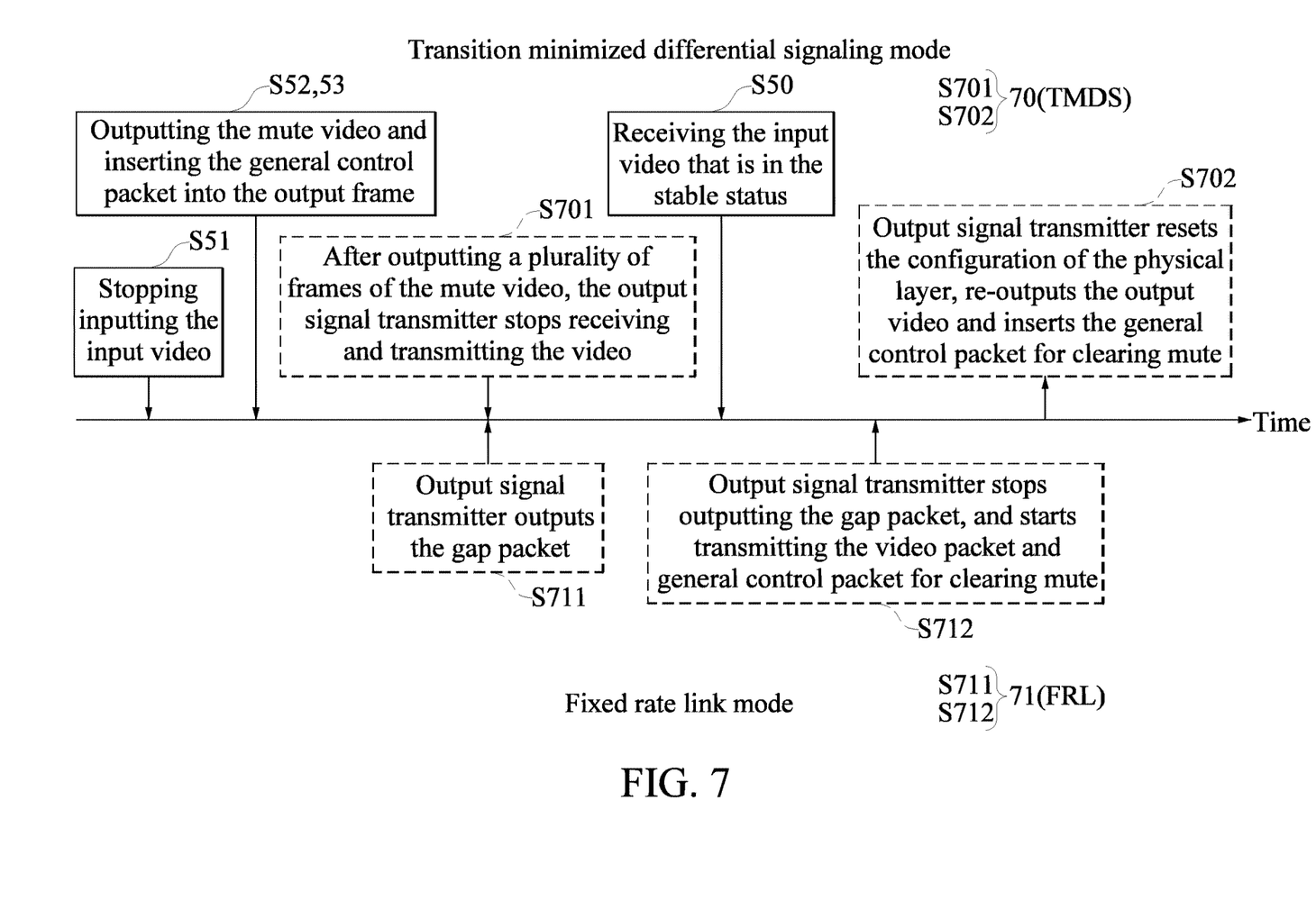
FIG. 7 is an operating sequence diagram of an operation of the video processor of FIG. 6 in a transition minimized differential signaling mode and a fixed rate link mode according to the first embodiment of the present disclosure.

FIG. 7 is an operating sequence diagram of an operation of the video processor of FIG. 6 in the TMDS mode and the FRL mode according to the first embodiment of the present disclosure. The flow of FIG. 5 can include a first sub-process 70 and a second sub-process 71 for controlling an audio-visual masking process.

When the video processor 60 is in the TMDS mode, the first sub-process 70 includes the following steps:

S701: after outputting a plurality of frames of the mute video, the output signal transmitter stops receiving and transmitting the video.

S702: the output signal transmitter resets a configuration of the physical layer, re-outputs the output video and inserts a general control packet for clearing mute.

In the first sub-process 70, steps S701 and S702 can be performed by the output signal transmitter 68. The detailed operation of the first sub-process 70 can be referred to in FIG. 5 and FIG. 6, and will not be reiterated herein.

When the video processor 60 is in the FRL mode, the second sub-process 71 includes the following steps:

S711: the output signal transmitter outputs the gap packet.

S712: the output signal transmitter stops outputting the gap packet, and starts transmitting a video packet and the general control packet for clearing mute.

In the second sub-process 71, steps S711 and S712 can be performed by the output signal transmitter 68. In the FRL mode, after steps S52 and S53, the output signal transmitter 68 continues to output the gap packet until the video processor 60 receives the input video V11 that is in the stable status, then the input video V11 is outputted to the input signal receiver 66 and the relay input video V110 is outputted to the input signal converter 67, and the receiving terminal 12 is notified to clear mute through the general control packet of the general control packet inserting module 65 for clearing mute. An advantage of the second sub-process 71 is that, the output signal transmitter 68 does not need to interrupt a FRL link when the input video V11 is unstable, so that a link training between the output signal transmitter 68 and the downstream receiving terminal 12, and the reconfiguration of the physical layer can be prevented, thereby speeding up a re-outputting of the video (e.g., to speed up a lighting of the display of the receiving terminal 12).

[Beneficial Effects of the Embodiment]

In conclusion, one of the beneficial effects of the present disclosure is that, by virtue of "the mute video being autonomously outputted to the receiving terminal when the input video is determined to be in the at least one of the idle status, the unstable status and the terminated status", the noise screen at the receiving terminal can be prevented and the user experience can be improved by the video processing method and the video processor provided by the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A video processing method utilized in a video processing system, the video processing system including a transmission terminal for generating an input video, a video processor, and a receiving terminal for receiving an output video, the video processing method comprising:

determining whether or not the input video is in at least one of an idle status, an unstable status and a terminated status;

switching from outputting the output video to outputting a mute video when the input video is determined to be in the at least one of the idle status, the unstable status and the terminated status;

inserting a first general control packet for setting mute into at least one of a plurality of output frames of the mute video; and stopping outputting the mute video after the plurality of output frames of the mute video are outputted.

2. The method according to claim 1, wherein the video processor is used to convert the input video conforming to a first video transmission protocol into the output video conforming to a second video transmission protocol.

3. The method according to claim 2, wherein the step of determining whether or not the input video is in the at least one of the idle status, the unstable status and the terminated status includes:

determining that the input video is in the idle status when the first video transmission protocol is a display port protocol and a value of a vertical blanking identification character bit [3] of the input video is 1.

4. The method according to claim 3, wherein the video processor includes an input signal receiver, a first-in first-out circuit, and an input signal converter; wherein the step of determining whether or not the input video is in the at least one of the idle status, the unstable status and the terminated status includes:

determining that the input video is in the unstable status or the terminated status when the video processor detects that an unlock of a clock data recovery has occurred at the input signal receiver, an overflow or an underflow has occurred at the first-in first-out circuit, and an error has occurred in the input signal converter when checking that the input signal receiver decodes 8-bits to 10-bits according to the display port protocol.

5. The method according to claim 3, wherein, when the second video transmission protocol is a high definition multimedia interface protocol, the video processor is a protocol converter.

6. The method according to claim 5, wherein a value of a Set_AVMUTE bit [4] of the first general control packet is 1.

7. The method according to claim 2, wherein, when each of the first video transmission protocol and the second video transmission protocol is a high definition multimedia interface protocol, the video processor is a high definition multimedia interface retimer, and the step of determining whether or not the input video is in the at least one of an idle status, an unstable status and a terminated status includes:

when the transmission terminal stops outputting a valid video or a plurality of active pixels without transmitting a set mute information of the first general control packet, the video processor instantly is capable of determining that the input video is in the unstable status or the terminated status.

8. The method according to claim 2, wherein, when the video processor is operated in a transition minimized differential signaling mode, the method further includes:

stopping receiving and outputting the input video when the input video is determined to be in the at least one of the idle status, the unstable status and the terminated status;

after determining that the input video is in a stable status, resetting a configuration of a physical layer of the input signal receiver of the video processor, so as to input the input video again; and resetting a configuration of the physical layer of an output signal transmitter of the video processor, so as to re-output the output video.

9. The method according to claim 8, wherein, when the value of the vertical blanking identification character bit [3] is not 1, the input signal is determined to be in the stable status.

10. A video processor utilized in a video processing system, the video processing system including a transmission terminal for generating an input video and a receiving terminal for receiving an output video, the video processor comprising:
- a signal instability detecting module, being used to generate a first detecting signal when detecting that the input video is in at least one of an idle status, an unstable status and a terminated status;
- a video masking processing controller coupled to the signal instability detecting module, the video masking processing controller being used to generate a first control signal according to the first detecting signal;
- an input signal tracking module coupled to the video masking processing controller, the input signal tracking module being used to stop tracking the input signal according to the first control signal;
- a mute screen generator coupled to the video masking processing controller, the mute screen generator being used to output a mute video including a plurality of output frames according to the first control signal, wherein each of the plurality of output frames is a mute screen;
- a general control packet inserting module coupled to the video masking processing controller, the general control packet inserting module being used to generate a first general control packet for setting mute according to the first control signal; and
- an output signal transmitter coupled to the video masking processing controller, the output signal transmitter being used to insert the first general control packet into a pixel window of one of the plurality of output frames of the mute video, and output the plurality of output frames of the mute video.

11. The video processor according to claim 10, further comprising:
- an input signal receiver correspondingly coupled to the signal instability detecting module and the input signal tracking module, the input signal receiver being used to convert the input video into a relay input video; and
- an input signal converter correspondingly coupled to the input signal tracking module and the output signal transmitter, the input signal converter being used to convert the relay input video conforming to a first video transmission protocol into a relay output video conforming to a second video transmission protocol.

12. The video processor according to claim 11, wherein, when the first video transmission protocol is a display port protocol, the signal instability detecting module is used to detect a value of a vertical blanking identification character bit [3] of the input video, so as to detect whether or not the input video is in the idle status; wherein, when the value of the vertical blanking identification character bit [3] of the input video is 1, the signal instability detecting module detects that the input video is in the idle status.

13. The video processor according to claim 12, wherein, when the signal instability detecting module detects that an unlock of a clock data recovery has occurred at the input signal receiver, an overflow or an underflow has occurred at a first-in first-out circuit for receiving the input video inside the input signal receiver, and an error has occurred in the input signal converter when checking that the input signal receiver decodes 8-bits to 10-bits according to the display port protocol, the signal instability detecting module detects that the input video is in the unstable status or the terminated status.

14. The video processor according to claim 12, wherein, when the second video transmission protocol is a high definition multimedia interface protocol, the video processor is a protocol converter.

15. The video processor according to claim 14, wherein, when the general control packet inserting module receives the first control signal, the general control packet inserting module is used to generate the first general control packet of which a value of a Set_AVMUTE bit [4] is 1 to the output signal transmitter.

16. The video processor according to claim 14, wherein, when the signal instability detecting module detects that the value of the vertical blanking identification character bit [3] is not 1 or the input signal is in a stable status, the signal instability detecting module outputs a second detecting signal to the video masking processing controller; the video masking processing controller generates a second control signal to the general control packet inserting module according to the second detecting signal; the general control packet inserting module generates a second general control packet of which a value of the Clear_AVMUTE bit [5] is 1 to the output signal transmitter according to the second control signal; the output signal transmitter stops generating the mute video and generates the output video to the receiving terminal according to the second general control packet.

17. The video processor according to claim 11, wherein, when each of the first video transmission protocol and the second video transmission protocol is a high definition multimedia interface protocol, the video processor is a high definition multimedia interface retimer.

18. The video processor according to claim 17, wherein, when the transmission terminal stops outputting a valid video or an active pixel without transmitting a set mute information of the general control packet, the signal instability detecting module detects that an anomaly has occurred at the first-in first-out circuit for receiving the input video inside the input signal receiver, and further detects that the input video is in the unstable status.

19. The video processor according to claim 10, wherein the input signal tracking module is used to track a rate of an input clock of the input video at a front end of the input signal tracking module and determine whether or not a rate of an output clock of the relay input video at a rear end of the input signal tracking module requires to be adjusted; when a difference between the rate of the input clock and the rate of the output clock reaches a threshold value, the input signal tracking module cancels tracking the input video.

20. The video processor according to claim 10, wherein, when the mute video generator receives the first control signal, the mute video generator is used to generate the mute screen that is all black according to a color coding corresponding to a color space outputted by the video processor; the color space is a red-green-blue color space or a YCbCr color space.

* * * * *